United States Patent
Kishore (10) Patent No.: US 9,422,488 B2
(45) Date of Patent: Aug. 23, 2016

(54) SYSTEM HAVING A FUEL INJECTOR WITH TIP COOLING

(75) Inventor: Allam Nanda Kishore, Bangalore (IN)

(73) Assignee: General Electric Company, Schenectady, NY (US)

(*) Notice: Subject to any disclaimer, the term of this patent is extended or adjusted under 35 U.S.C. 154(b) by 917 days.

(21) Appl. No.: 13/292,049

(22) Filed: Nov. 8, 2011

(65) Prior Publication Data

US 2013/0112772 A1    May 9, 2013

(51) Int. Cl.
| | | |
|---|---|---|
| *B05B 15/00* | (2006.01) | |
| *C10J 3/50* | (2006.01) | |
| *F23D 1/00* | (2006.01) | |
| *F23D 11/36* | (2006.01) | |
| *F23D 11/40* | (2006.01) | |

(52) U.S. Cl.
CPC . *C10J 3/506* (2013.01); *F23D 1/00* (2013.01); *F23D 1/005* (2013.01); *F23D 11/36* (2013.01); *F23D 11/40* (2013.01); *C10J 2200/152* (2013.01); *F23D 2214/00* (2013.01); *F23D 2900/00006* (2013.01); *Y02E 20/16* (2013.01); *Y02E 20/18* (2013.01)

(58) Field of Classification Search
CPC ......... C01B 3/363; F23D 14/78; F23D 11/40; F23D 1/00; F23D 1/005; F23D 11/36; F02M 53/043; C10J 3/506
USPC ............................... 239/132–132.5, 422–424
See application file for complete search history.

(56) References Cited

U.S. PATENT DOCUMENTS

| | | | | |
|---|---|---|---|---|
| 3,743,606 A | * | 7/1973 | Marion | .................... C01B 3/363 252/373 |
| 3,874,592 A | * | 4/1975 | Buschmann | ............ F23D 11/36 239/132.3 |
| 4,519,321 A | | 5/1985 | Poll et al. | |
| 4,525,175 A | * | 6/1985 | Stellaccio | ................ C10J 3/506 239/132.3 |
| 4,858,538 A | | 8/1989 | Kuypers et al. | |
| 4,865,542 A | | 9/1989 | Hasenack et al. | |
| 5,785,721 A | * | 7/1998 | Brooker | .................... C10J 3/506 239/419.5 |
| 5,941,459 A | | 8/1999 | Brooker et al. | |
| 2006/0231645 A1 | | 10/2006 | Chan | |
| 2011/0303758 A1 | * | 12/2011 | Mishra | .................. B05B 7/0433 239/13 |

FOREIGN PATENT DOCUMENTS

CN          201386085 Y     1/2010

OTHER PUBLICATIONS

Unofficial English Translation of Chinese Office Action issued in connection with corresponding CN Application No. 201210442429.7 on Sep. 30, 2015.

* cited by examiner

*Primary Examiner* — Len Tran
*Assistant Examiner* — Joel Zhou
(74) *Attorney, Agent, or Firm* — Fletcher Yoder, P.C.

(57) ABSTRACT

A system includes a gasification fuel injector. The gasification fuel injector includes a tip portion surrounding an injection passage configured to inject a fluid in a downstream direction. The tip portion includes an inner wall surrounding the injection passage and extending in the downstream direction from a neck to a rim, an outer wall surrounding the inner wall and extending from the neck to the rim, and a coolant chamber between the inner and outer walls. The outer wall includes a curved wall portion extending in the downstream direction away from the rim.

23 Claims, 5 Drawing Sheets

SYSTEM HAVING A FUEL INJECTOR WITH TIP COOLING

BACKGROUND OF THE INVENTION

The subject matter disclosed herein relates to fuel injectors, and, more particularly, to fuel injectors for gasifiers.

A variety of combustion systems employ fuel injectors to inject a fuel into a combustion chamber. For example, an integrated gasification combined cycle (IGCC) power plant includes a gasifier with one or more fuel injectors. The fuel injectors supply a fuel, such as an organic feedstock, into the gasifier along with oxygen and steam to generate a syngas. In general, combustion occurs downstream from the fuel injectors. However, a flame and/or heat from combustion in close proximity to the fuel injectors can reduce the life of the fuel injectors, particularly if the fuel injectors exceed certain temperatures. For example, the fuel injector may be subject to increasingly greater temperatures toward the tip and/or other locations close to the flame. Unfortunately, the lives of fuel injectors may be reduced by such high temperatures, even when existing cooling techniques are used.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification fuel injector. The gasification fuel injector includes a tip portion surrounding an injection passage configured to inject a fluid in a downstream direction. The tip portion includes an inner wall surrounding the injection passage and extending in the downstream direction from a neck to a rim, an outer wall surrounding the inner wall and extending from the neck to the rim, and a coolant chamber between the inner and outer walls. The outer wall includes a curved wall portion extending in the downstream direction away from the rim.

In a second embodiment, a system includes a fuel injector. The fuel injector includes a fuel passage configured to inject a fuel in a downstream direction, an oxygen passage configured to inject oxygen in the downstream direction, and a tip portion surrounding the fuel passage and the oxygen passage. The tip portion includes an inner wall surrounding the fuel passage and the oxygen passage and extending in the downstream direction from a neck to a rim, an outer wall surrounding the inner wall and extending from the neck to the rim, and a coolant chamber between the inner and outer walls. The outer wall includes a curved wall portion extending in the downstream direction away from the rim. The tip portion includes a coolant inlet and a coolant outlet radially through the outer wall into the coolant chamber.

In a third embodiment, a system includes a combustion chamber and a fuel injector coupled to the combustion chamber. The fuel injector includes a fuel passage configured to inject a fuel in a downstream direction and a tip portion surrounding the fuel passage. The tip portion includes an inner wall surrounding the fuel passage and extending in the downstream direction from a neck to a rim, an outer wall surrounding the inner wall and extending from the neck to the rim, and a coolant chamber between the inner and outer walls. The outer wall includes a curved wall portion extending in the downstream direction away from the rim. The outer wall has an outer wall diameter relative to a longitudinal axis of the fuel injector, and the outer wall diameter progressively increases and then progressively decreases from the rim to the neck.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A combustion system may utilize fuel injectors to inject fuel, and optionally other fluids, into a combustion chamber. For example, an IGCC power plant may have a gasifier that includes one or more gasification fuel injectors. Because combustion occurs near a tip of the fuel injector, the tip may be exposed to temperatures up to approximately 1,300 degrees Celsius (C). In addition, hot combustion gases may recirculate back toward the fuel injector. Such high temperatures may prematurely wear the fuel injector even though the injector is made from materials specifically designed for high temperatures. Accordingly, different cooling methods may be used to increase the life of fuel injectors. For example, fuel injector tips may have an integral coolant chamber to flow a coolant. In addition, a cooling coil may surround the body of the fuel injector to carry coolant to the coolant chamber. Thus, an outer surface of the fuel injector may be exposed to hot recirculated gases, while an inner surface of the fuel injector may be in contact with the coolant. For example, the temperature of the coolant may be approximately 40 degrees C., resulting in a temperature difference of approximately 1,260 degrees C. Such a large temperature gradient may result in cracks near the tip of the fuel injector. Specifically, the high temperatures and temperature fluctuations may cause radial cracks near the tip. In addition, high strain forces caused by the high temperature gradient may cause circumferential cracks. Furthermore, thicker coolant chamber walls designed for added strength may inhibit heat transfer, thereby contributing to the large temperature gradients. In addition, sulfur compounds in the hot combustion gases may tend to deposit on hotter surfaces, such as thick coolant chamber walls, where the sulfur compounds then accelerate corrosion of the metal. The cracks and corrosion caused by these difference mechanisms may eventually reduce the life of the fuel injector.

To address these issues, in various embodiments described below, a gasification fuel injector includes a tip portion that surrounds an injection passage that injects a fluid, such as fuel or another fluid, in a downstream direction. Specifically, the tip portion may include an inner wall that surrounds the injection passage and extends in the downstream direction from a neck to a rim. The tip portion may also include an outer wall that surrounds the inner wall and extends from the neck to the rim. Further, the tip portion may include a coolant chamber disposed between the inner and outer walls. Thus, a coolant may flow through the coolant chamber to help reduce a temperature of the tip portion. In certain embodiments, the outer wall includes a curved wall portion that extends in the downstream direction away from the rim. The curved wall portion may improve the flexibility of the tip portion, thereby reducing strain experienced by the tip portion. The reduction of strain in the tip portion may reduce the possibility of radial and circumferential cracks forming in the tip portion. In addition, the curved wall portion may be strong enough to resist buckling caused by a pressure differential across the tip portion. In other embodiments, a coolant inlet coupled to the coolant chamber may be used to carry the coolant into the coolant chamber and a coolant outlet coupled to the coolant chamber may be used to remove the heated coolant from the coolant chamber. The coolant inlet and the coolant outlet may carry the coolant radially through the outer wall into the coolant chamber. In further embodiments, the outer wall may be characterized by an outer wall diameter relative to a longitudinal axis of the fuel injector. The outer wall diameter may progressively increase and then progressively decrease in the direction from the rim to the neck. Such a progressively increasing and decreasing outer wall diameter may improve the flexibility of the tip portion, thereby reducing the possibility of cracks.

Figure 1:
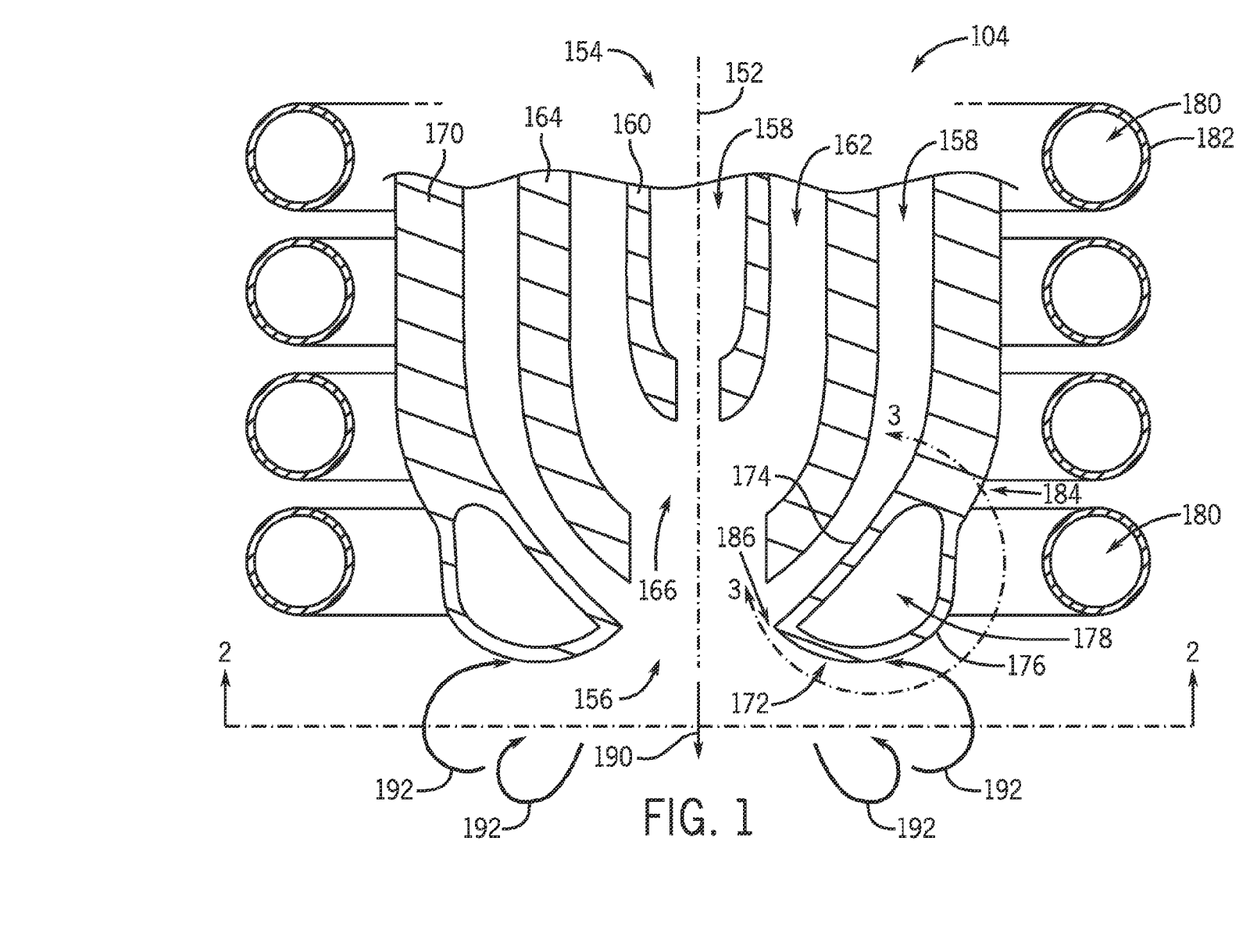
FIG. 1 is an axial cross-section of an embodiment of a fuel injector with a coolant chamber.

FIG. 1 is an axial cross-section of a fuel injector 104 in accordance with an embodiment. A longitudinal axis 152 passes lengthwise through the center of the fuel injector 104. The fuel injector 104 has an upstream side 154, from which a feedstock, oxygen, and other materials may originate. The fuel injector 104 also has a downstream side 156, where the feedstock, oxygen, and other materials may exit. Thus, the downstream side 156 is an outlet for the materials. Turning next to the passages of the fuel injector 104, although one arrangement of passages will be described, other arrangements are possible depending on the requirements of a particular combustion system. Specifically, the inner most material passing through the fuel injector 104 is oxygen 158, which is directed to the downstream side 156 by a first oxygen passage 160. The first oxygen passage 160 supplies oxygen 158 for combustion downstream of the fuel injector 104. Oxygen 158 may include, but is not limited to, pure oxygen, oxygen mixtures, and air. The next outermost material is a fuel 162, which is directed to the downstream side 156 by a fuel passage 164. Thus, the fuel passage 164 surrounds the first oxygen passage 160 in a co-axial or concentric arrangement. The fuel 162 may include a dry fuel, a slurry fuel, a liquid fuel, or any combination thereof. The fuel passage 164 directs the fuel 162 downstream of the oxygen 158 from the first oxygen passage 160 to enhance the mixing of the fuel 162 and oxygen 158. The region where the oxygen 158 from the first oxygen passage 160 and the fuel 162 combine may be referred to as pre-mix zone 166. The next outermost material is oxygen 158, which is directed to the downstream side 156 by a second oxygen passage 170. Thus, the second oxygen passage 170 surrounds the fuel passage 164 in a co-axial or concentric arrangement. The second oxygen passage 170 may direct oxygen 158 to the mixture of the fuel 162 and oxygen 158 from the first oxygen passage 160 to produce a fine spray for efficient combustion. The oxygen 158 from the second oxygen passage 170 may also include, but is not limited to, pure oxygen, oxygen mixtures, and air.

The portion of the oxygen passage 170 adjacent to the downstream side 156 may be referred to as a tip portion 172. Specifically, the tip portion 172 injects the mixture of the fuel 162 and the oxygen 158 in a downstream direction, as indicated by arrow 190. In addition, the tip portion 172 surrounds the other injection passages of the fuel injector 104, such as the first oxygen passage 160 and the fuel passage 164. The tip portion 172 includes an inner wall 174 that surrounds the first oxygen passage 160 and the fuel passage 164. The tip portion 172 may also include an outer wall 176 that surrounds the inner wall 174. The tip portion 172 may also include a coolant chamber 178 disposed between the inner wall 174 and the outer wall 176. A coolant 180 may be delivered to the coolant chamber 178 via a cooling coil 182. Specifically, the coolant 180 may enter the cooling coil 182 near the upstream side 154 of the fuel injector 104. The coolant 180 then circulates through the cooling coil 182 until the coolant 180 enters the coolant chamber 178. Examples of coolants 180 include, but are not limited to, water, steam, carbon dioxide, nitrogen, and combinations thereof. Indeed, the coolant 180 may include any suitable coolant gas, coolant liquid, coolant mixture, or any combination thereof. As each of these materials have different heat transfer characteristics, a particular coolant 180 may be selected depending on the particular requirements of the fuel injector 104. As the coolant 180 passes through the coolant chamber 178, the coolant 180 may increase in temperature as the walls (e.g., outer wall 176) are exposed to the hot combustion gases. However, this heat may be removed from the tip portion 172 as the warm coolant 180 exits the coolant chamber 178. The warm coolant 180 may be passed through a heat exchanger to be cooled and circulated back to the fuel injector 104. A refrigerant or air, for example, may be used for cooling in the heat exchanger. By absorbing the heat from the hot combustion gases and carrying it away from the fuel injector 104, the coolant chamber 178 may help to protect the fuel injector 104 from thermal stress and wear. In addition, the cooling coil 182, coolant chamber 178, and tip portion 172 may be fabricated from materials specifically designed for high temperatures, such as, but not limited to, austenitic nickel-chromium based superalloys and cobalt-chromium-iron heat resistant alloys.

As shown in FIG. 1, the inner wall 174 and the outer wall 176 extend from a neck 184 of the fuel injector 104 to a rim 186. The neck 184 may correspond to where the inner wall 174 and the outer wall 176 join together above the coolant chamber 178. The rim 186 may correspond to where the inner wall 174 and the outer wall 176 join together at the downstream side 156. As described in detail below, the inner wall 174 has a generally straight cross-sectional shape, and the outer wall 176 has a generally curved (e.g., circular, elliptical, parabolic, hyperbolic, convex, outwardly curved) cross-sectional shape. When viewed in three dimensions, the inner wall 174 may have a generally conical shape, and the outer wall 176 may have generally spherical shape. Thus, when viewed in three dimensions, the tip portion 172 may have a generally toroidal or doughnut shape. Specifically, the curved shape of the outer wall 176 extends in the downstream direction 190 away from the rim 186. Thus, the outwardly curved shape of the outer wall 176 may help to protect the rim 186 from recirculated hot combustion gases 192. Specifically, during operation of the fuel injector 104, the hot combustion gases 192 may recirculate toward the tip portion 172 of the fuel injector 104. As shown in FIG. 1, the outwardly curved shape of the outer wall 176 may help to block at least a portion of the hot combustion gases 192 from reaching the rim 186, thereby helping to reduce a temperature of the rim 186 and temperature-related strain and stress that can cause cracks and other damage. In other words, the outwardly curved shape of the outer wall 176 fills any space that could otherwise allow for recirculation of the hot combustion gases 192. In certain embodiments, the inner wall 174 is an inner annular wall, the outer wall 176 is an outer annular wall, and the outer annular wall 176 is coaxial with the inner annular wall 174. In addition, the coolant chamber 178 may be an annular coolant chamber disposed between the inner and outer annular walls, the rim 186 may be an annular rim, and the neck 184 may be an annular neck.

Figure 2:
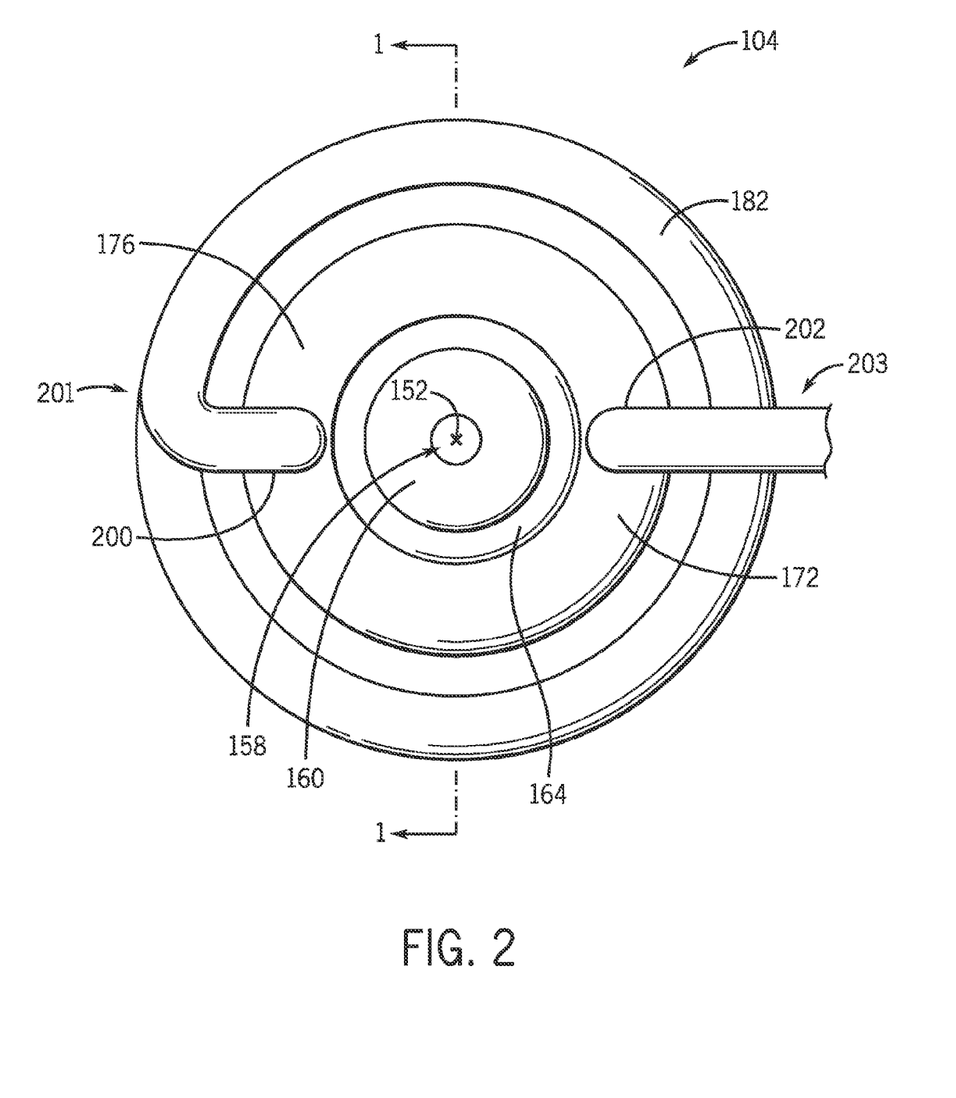
FIG. 2 is a bottom view of an embodiment of a fuel injector with a coolant chamber.

To illustrate the configuration of the passages and cooling coil 182 described above, FIG. 2 is a bottom view of the tip portion 172 of the fuel injector 104 along the line labeled 2-2 in FIG. 1. Correspondingly, the axial cross-section of FIG. 1 is indicated along the line labeled 1-1 in FIG. 2. Elements in common with those shown in FIG. 1 are labeled with the same reference numerals. As illustrated in FIG. 2, the passages 160 and 164, and the tip portion 172 are annular and coaxial with one another, and the cooling coil 182 encircles the passages leading to the cooling chamber 178. In the particular embodiment shown, an entrance 200 of the cooling coil 182 is coupled to the coolant chamber 178 through the outer wall 176 on a first side 201 of the fuel injector 104, and an exit 202 of the cooling coil 182 is coupled to the coolant chamber 178 through the outer wall 176 on a second side 203 of the coolant chamber 178, opposite from the first side 201. The exit 202 of the cooling coil 182 carries the warm coolant 180 away from fuel injector 104 to be cooled and recirculated back to the fuel injector 104, as described above. As shown in FIG. 2, the coolant 180 enters the coolant chamber 178 in a radial direction with respect the longitudinal axis 152 of the fuel injector 104. Specifically, the entrance 200 and the exit 202 are connected radially through the outer wall 176 into the coolant chamber 178. In other words, the coolant 180 flow circumferentially through the coolant chamber 178.

Figure 3:
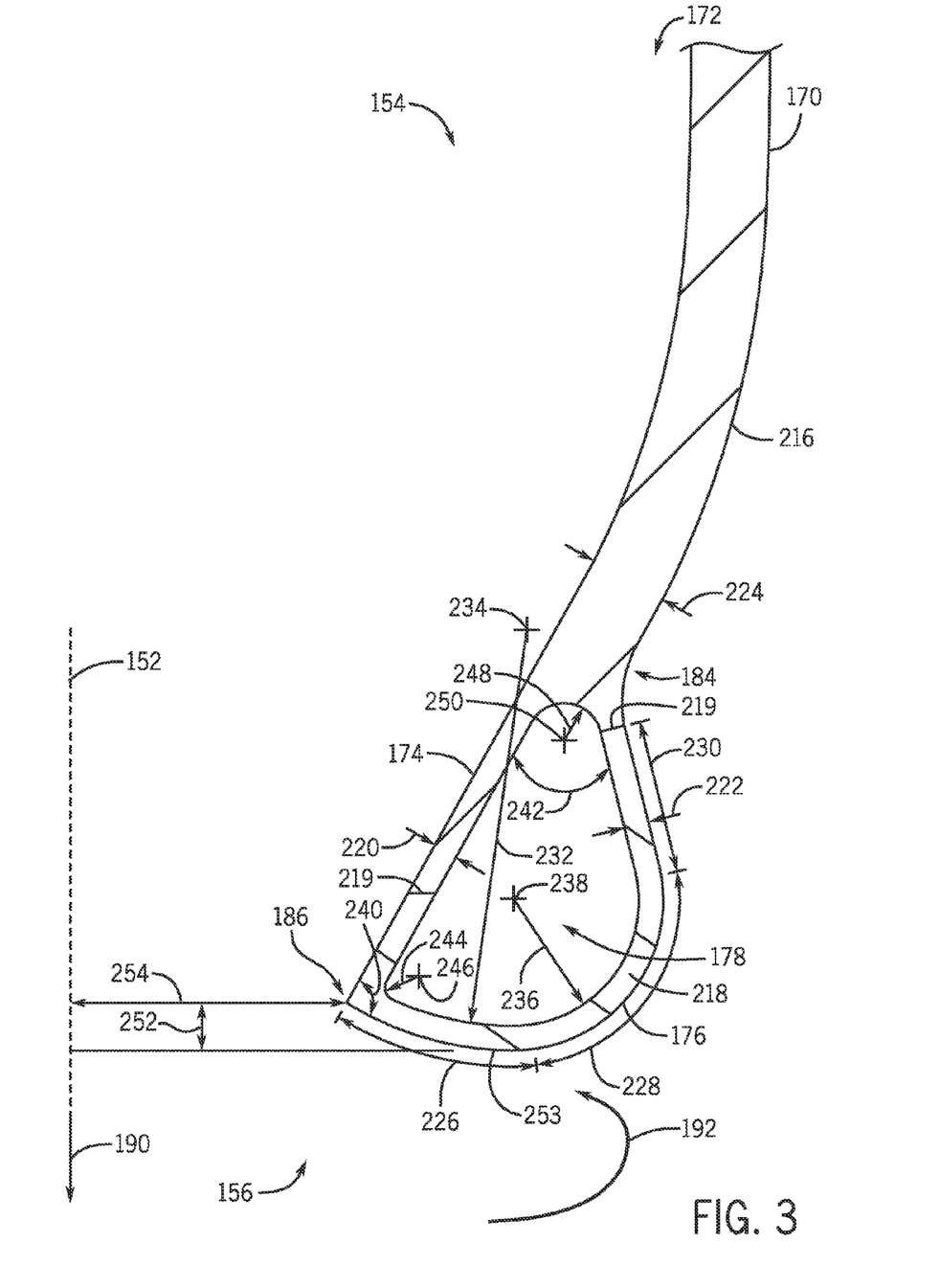
FIG. 3 is an axial cross-section of an embodiment of a tip portion of a fuel injector with two radii of curvature.

FIG. 3 is an axial cross-section of the tip portion 172 along the line labeled 3-3 in FIG. 1. In the illustrated embodiment, the tip portion 172 may be made from two different metals. Specifically, an upper portion 216 of the tip portion 172 may be made from a first metal, and a lower portion 218 may be made from a second metal. The upper portion 216 and the lower portion 218 may be joined at an interface 219. Both the upper and lower portions 216 and 218 may be made from metals selected specifically for high temperature service. However, the metal selected for the lower portion 218 may be suitable for use at higher temperatures than the metal selected for the upper portion 216 because the lower portion 218 may be exposed to higher temperatures than the upper portion 216. In other words, the lower portion 218 may be closer to the hot combustion gases 192. For example, the upper portion 216 may be made from an austenitic nickel-chromium based superalloy, such as Inconel® alloy 625 and the lower portion 218 may be made from a heat resistant cobalt superalloy, such as UMCo 50. In other embodiments, other suitable metals or alloys may be used for the upper and lower portions 216 and 218. In further embodiments, the upper and lower portions 216 and 218 may be made from the same material or metal, such as Inconel® alloy 625 or UMCo 50.

As shown in FIG. 3, the inner wall 174 may be characterized by an inner wall thickness 220, and the outer wall 176 may be characterized by an outer wall thickness 222, both of which may be constant. In other words, the inner and outer wall thicknesses 220 and 222 may not vary along the lengths of the inner and outer walls 174 and 176. In certain embodiments, the inner wall thickness 220 and the outer wall thickness 222 may be approximately the same. For example, in certain embodiments, the inner and outer wall thicknesses 220 and 222 may be between approximately 0.23 to 0.61, 0.41 to 0.56, or 0.46 to 0.51 cm. The inner and outer wall thicknesses 220 and 222 may be selected to provide suitable heat transfer characteristics of the inner and outer walls 174 and 176. For example, thinner walls may increase heat transfer and thicker walls may reduce heat transfer. In addition, the inner and outer wall thicknesses 220 and 222 may be selected to provide suitable strength and buckling characteristics, as described in detail below. Further, by selecting the inner and outer wall thicknesses 220 and 222 to be approximately the same, the cost and complexity associated with fabricating the tip portion 172 may be reduced. As shown in FIG. 3, the neck 184 may be characterized by a neck thickness 224, which may be approximately constant from the neck 184 along the length of the second oxygen passage 170 toward the upstream side 154. Thus, the heat transfer characteristics of the second oxygen passage 170 may be approximately the same from the neck 184 to the upstream side 154. In other words, corrosion problems that may be caused by necks 184 with neck thicknesses 224 greater than a thickness of the second oxygen passage 170 may be avoided. For example, necks 184 with such large neck thicknesses 224 may suffer from reduced heat transfer and reduced cooling. Sulfur compounds in the hot combustion gases 192 may tend to deposit in such high temperature areas at higher rates, thereby increasing sulfur-related corrosion of the metal. Such high temperature areas may be avoided when the neck thickness 224 is generally uniform along the second oxygen passage 170, as shown in FIG. 3.

In the illustrated embodiment, the outer wall 176 may include a first curved portion 226, a second curved portion 228, and a straight portion 230. When viewed in three dimensions, the first and second curved portions 226 and 228 may have a generally spherical shape and the straight portion 230 may have a generally conical shape. In other words, the first and second curved portions 226 and 228 may have outwardly curved (e.g., circular, elliptical, parabolic, hyperbolic, or convex) annular surfaces. The first and second curved portions 226 and 228 extend in the downstream direction 190 away from the rim 186. As shown in FIG. 3, the first curved portion 226 may extend directly from the rim 186, the straight portion 230 may extend from the neck 184, and the second curved portion 228 may be located between the first curved portion 226 and the straight portion 230. Specifically, the first curved portion 226 may be characterized by a first radius of curvature 232 with a first center 234. For example, a length of the first radius of curvature 232 may be between approximately 6.1 to 9.1, 6.6 to 8.6, or 7.1 to 8.1 cm. Similarly, the second curved portion 228 may be characterized by a second radius of curvature 236 with a second center 238. For example, a length of the second radius of curvature 236 may be between approximately 1.0 to 4.0, 1.5 to 3.6, or 2.0 to 3.0 cm. Thus, the first radius of curvature 232 may be greater than the second radius of curvature 236. Therefore, the second curved portion 228 may be more curved than the first curved portion 226. Such a configuration of the outer wall 176 may have improved flexibility and thus, reduced strain, as discussed in detail below. By improving flexibility and reducing strain, the probability of forming cracks in the tip portion 172 may be reduced.

The tip portion 172 of the illustrated embodiment may be characterized by a rim angle 240, which constitutes an angle between the inner wall 174 and the outer wall 176 at the rim 186. As shown in FIG. 3, the first curved portion 226 extends directly from the rim 186. In other words, the outer wall 176 adjacent to the rim 186 does not include a straight portion, but instead is curved directly from the rim 186. The rim angle 240 may be approximately a right angle because of the arrangement of the first curved portion 226 with the inner wall 174 at the rim 186. For example, the rim angle 240 may be between approximately 70 to 100, 75 to 95, or 80 to 90 degrees. In addition, the outer wall 176 adjacent to the rim 186 is angled initially toward the downstream side 156 away from the rim 186 and then curves toward the upstream side 154. In other words, the outer wall 176 curves in the downstream direction 190 from the rim 186, and then curves in an upstream direction opposite from the downstream direction 190. Thus, the outer wall 176 helps to block the hot combustion gases 192 from reaching the rim 186 because of the curvature of the outer wall 176 and the relatively large rim angle 240. Increasing the rim angle 240 may help to reduce strain in the outer wall 176 near the rim 186. In addition, the tip portion 172 may be characterized by a neck angle 242. For example, the neck angle 242 may be between approximately 30 to 60, 35 to 55, or 40 to 50 degrees. Again, a larger neck angle 242 may be associated with the curved outer wall 176 helping to block the rim 186 from the hot combustion gases 192. In other words, a larger neck angle 242 results in the moving the outer wall 176 further away from the rim 186. In addition, the coolant chamber 178 may be defined by a rim radius of curvature 244 with a rim center 246, and a neck radius of curvature 248 with a neck center 250. In other words, the internal surfaces of the coolant chamber 178 exposed to the coolant 180 may have a curved interface between the inner and outer walls 174 and 176. For example, a length of the rim radius of curvature 244 may be between approximately 0.16 to 0.38, 0.28 to 0.36, or 0.30 to 0.33 cm. Similarly, a length of the neck radius of curvature 248 may be between approximately 0.64 to 0.89, 0.71 to 0.81, or 0.74 to 0.79 cm. Thus, the coolant chamber 178 may have very curved interfaces between the inner and outer walls 174 and 176 because of the small values of the rim and neck radii of curvature 244 and 248.

The tip portion 172 of the illustrated embodiment may also be characterized by an axial distance 252 between the rim 186 and an outermost protrusion 253 of the outer wall 176. For example, the axial distance 252 may be between approximately 0.64 to 0.89, 0.71 to 0.81, or 0.74 to 0.79 cm. Thus, the axial distance 252 may define a bulge of the outer wall 176 away from the rim 186. This bulge of the outer wall 176 may help to block the hot combustion gases 192 from reaching the rim 176. In addition, the tip portion 172 may be characterized by an outer wall diameter 254 between the outer wall 176 and the longitudinal axis 152. As shown in FIG. 3, the outer wall diameter 254 coincides with a distance between the rim 186 and the longitudinal axis 152 at the rim 186. Moving away from the rim 186, the outer wall diameter 254 progressively increases along the first curved portion 226 and the second curved portion 228. Near the end of the second curved portion 228, the outer wall diameter 254 reaches a maximum. The outer wall diameter 254 then progressively decreases along the straight portion 230 toward the neck 184. In other words, the outer wall diameter 254 progressively increases and then progressively decreases from the rim 186 to the neck 184. This progressive increase and decrease of the outer wall diameter 254 results in a shape of the tip portion 172 that may help to block the hot combustion gases 192 from reaching the rim 176.

In certain embodiments, the shape of the tip portion 172 may be characterized by one or more dimensionless ratios. For example, a measure of curvature may be defined as a ratio of the first radius of curvature 232 to the outer wall diameter 254 or a ratio of the second radius of curvature 236 to the outer wall diameter 254. In certain embodiments, the measure of curvature based on the first radius of curvature 232 may be between approximately 1.05:1 to 1.65:1, 1.15:1 to 1.55:1, or 1.25:1 to 1.45:1. In other embodiments, the measure of curvature based on the second radius of curvature 236 may be between approximately 0.05:1 to 0.75:1, 0.15:1 to 0.65:1, or 0.25:1 to 0.55:1. Another dimensionless ratio may be a measure of distance downstream of the rim 186, which may be defined as a ratio of the axial distance 252 to the outer wall diameter 254. In certain embodiments, the measure of distance downstream of the rim 186 may be between approximately 0.08:1 to 0.2:1, 0.1:1 to 0.18:1, or 0.12:1 to 0.16:1. For example, such ratios may be used to determine the appropriate dimensions of the tip portion 172 when scaling up or scaling down.

Figure 4:
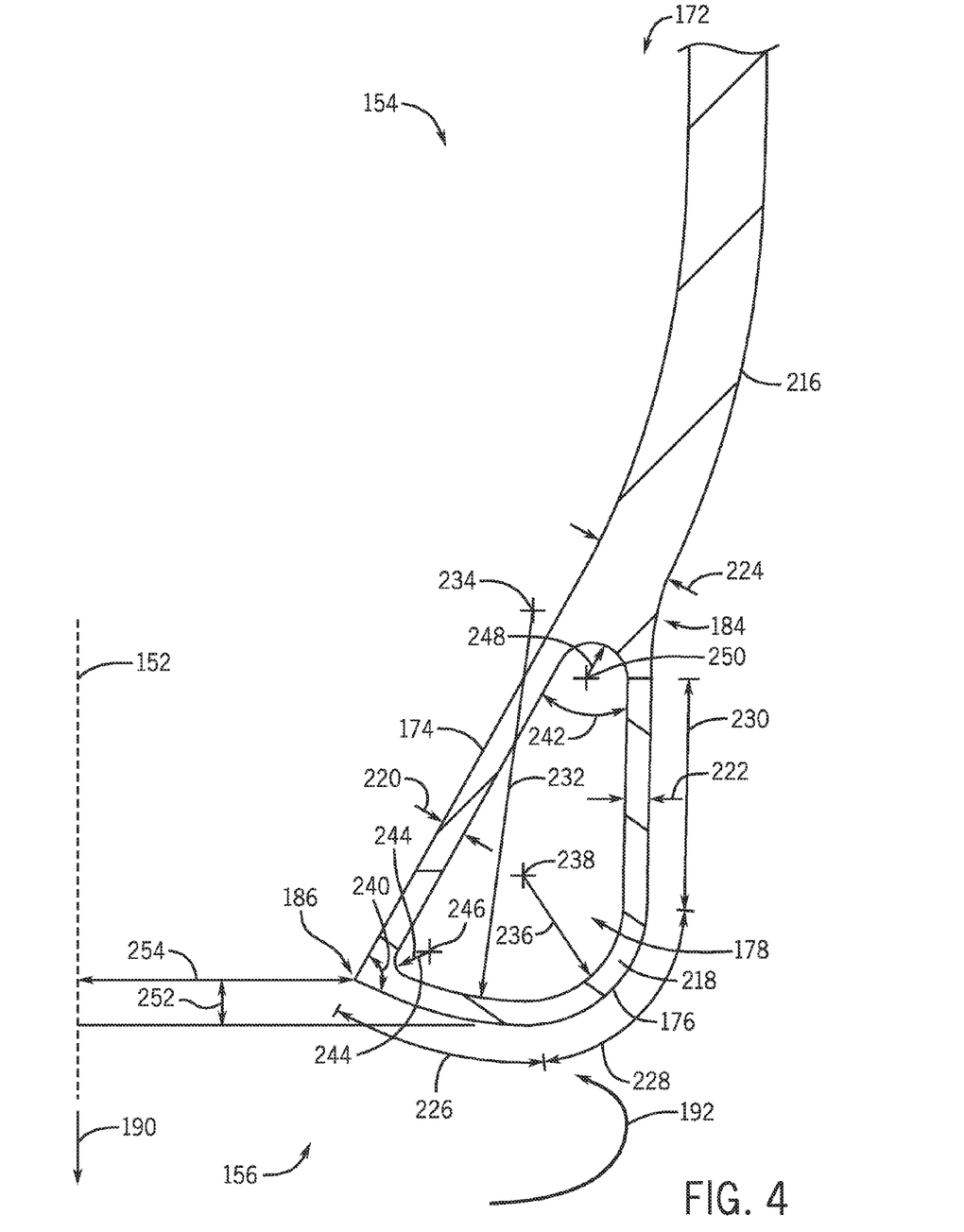
FIG. 4 is an axial cross-section of an embodiment of a tip portion of a fuel injector with two radii of curvature.

FIG. 4 is an axial cross-section of another embodiment of the tip portion 172. Elements in FIG. 4 in common with those shown in FIG. 3 are labeled with the same reference numerals. As with the embodiment shown in FIG. 3, when viewed in three dimensions, the first and second curved portions 226 and 228 of the illustrated embodiment may have a generally spherical shape and the straight portion 230 may have a generally cylindrical shape. Thus, the tip portion 172 may have a generally toroidal shape. As shown in FIG. 4, the straight portion 230 is longer than the second curved portion 228. In the embodiment shown in FIG. 3, the second curved portion 228 is longer than the straight portion 230. The flexibility and strength of the tip portion 172 shown in FIG. 4 may be different from the flexibility and strength of the tip portion shown in FIG. 3 because of the different lengths of the second curved portion 228 and the straight portion 230 in the two embodiments. For example, in a longer portion of the outer wall 176, the strain may be distributed over a larger area. Accordingly, in a shorter portion of the outer wall 176, the strain may be concentrated in a smaller area. Areas of concentrated strain may be more likely to crack when exposed to high temperatures. For example, the expected life of the straight portion 230 of the embodiment shown in FIG. 4 may be expected to be greater than the expected life of the straight portion 230 of the embodiment shown in FIG. 3 because the straight portion 230 shown in FIG. 4 is longer than the straight portion 230 shown in FIG. 3. Thus, the strain may be distributed over a larger area for the straight portion 230 shown in FIG. 4, thereby increasing its expected life. In addition, strain may be expected to be less in the first and second curved portions 226 and 228 than in the straight portion 230 because the first and second curved portions 226 and 228 may be more flexible than the straight portion 230.

Another difference between the embodiments shown in FIGS. 3 and 4 is that the second radius of curvature 236 shown in FIG. 4 is smaller than the radius of curvature 236 shown in FIG. 3. For example, a length of the second radius of curvature 236 shown in FIG. 4 may be between approximately 1.91 to 2.16, 1.96 to 2.11, or 2.01 to 2.06 cm. The smaller second radius of curvature 236 shown in FIG. 4 may correspond to the shorter second curved portion 228 of the illustrated embodiment. In general, as a radius of curvature increases, more material may be used in the corresponding portion of the tip portion 172, thereby decreasing the strain in that portion. In addition, the neck angle 242 shown in FIG. 4 may be less than the neck angle 242 shown in FIG. 3. For example, the neck angle 242 shown in FIG. 4 may be between approximately 15 to 45, 20 to 40, or 25 to 35 degrees. By reducing the neck angle 242, the length of the second curved portion 228 may be decreased and a length of the straight portion 230 increased. In addition, the strain near the neck 184 may be reduced because of the smaller neck angle 242 of the illustrated embodiment. Further, the outer wall diameter 254 progressively increases and then progressively decreases from the rim 186 to the neck 184 as with the embodiment shown in FIG. 3. However, the amount of the progressive decrease of the outer wall diameter 254 in the illustrated embodiment is less than that of the embodiment shown in FIG. 3.

Figure 5:
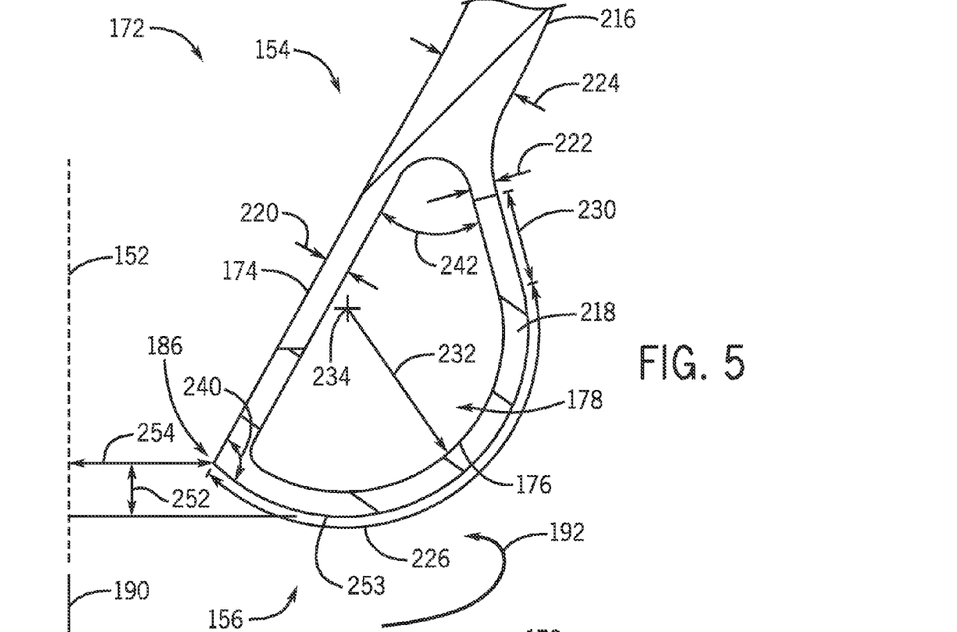
FIG. 5 is an axial cross-section of an embodiment of a tip portion of a fuel injector with one radius of curvature.

FIG. 5 is an axial cross-section of an embodiment of the tip portion 172 with a single curved portion 226. As shown in FIG. 5, the outer wall 176 includes the curved portion 226 and the straight portion 230, but not the second curved portion 228 of previous embodiments. Accordingly, the curvature of the outer wall 176 may be defined only by the first radius of curvature 232. Therefore, the tip portion 172 shown in FIG. 5 may be less costly and less complicated to fabricate because only the first radius of curvature 232 is used. In addition, the tip portion 172 shown in FIG. 5 may have more strain than the previous embodiments shown in FIG. 3 and FIG. 4 because of the increased curvature adjacent to the rim 186. In other words, the strain in the tip portion 172 may be expected to be lower in straighter or less curved portions of the tip portion 172. However, the tip portion 172 shown in FIG. 5 may have a higher buckling strength than the previous embodiments, as described in detail below. In addition, the axial distance 252 of the tip portion 172 shown in FIG. 5 is greater than the axial distance 252 of previous embodiments. The axial distance 252 of the illustrated embodiment may larger because only the first radius of curvature 232 is used. Thus, the outermost protrusion 253 of the outer wall 176 may be closer to the hot combustion gases 192 and exposed to higher temperatures than in previous embodiments. In addition, the rim angle 240 of the illustrated embodiment may be greater than the rim angle 240 of previous embodiments because only the first radius of curvature 232 is used. For example, the rim angle 240 shown in FIG. 5 may be between approximately 95 to 125, 100 to 120, or 105 to 115 degrees.

Figure 6:
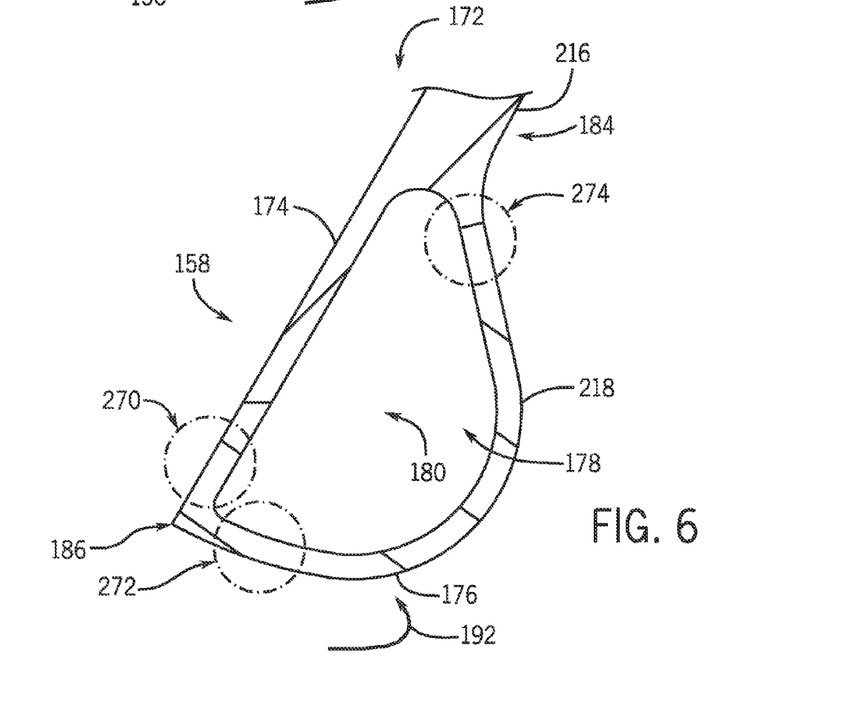
FIG. 6 is an axial cross-section of an embodiment of a tip portion of a fuel injector illustrating buckling characteristics.

As discussed above, the illustrated embodiments may have improved buckling characteristics. FIG. 6 is an axial cross-section of the tip portion 172 showing critical locations with respect to buckling, which may be defined as bending or failure of a wall of the tip portion 172 caused by high pressure. As shown in FIG. 6, the tip portion 172 may include an oxygen side critical location 270, a tip face critical location 272, and an upper channel critical location 274. The critical locations 270, 272, and 274 represent areas where high pressure is more likely to cause bending or failure of the tip portion 172. For example, if the pressure of the hot combustion gases 192 is increased, failure of the tip portion 172 may be more likely at one of the critical locations 270, 272, and 274. Such high pressures may not be expected to occur during normal operation, but design of fuel injectors 104 to withstand such pressures provides for a safety factor. For the illustrated embodiments, at very high pressures of the hot combustion gases 192, the tip portion 172 may be expected to buckle preferentially at the tip face critical location 272 of the outer wall 176. Such a failure of the tip portion 172 may cause the hot combustion gases 192 to enter the coolant chamber 178, which may be easily detected in the coolant 180. For example, the electrical characteristics of the coolant 180 may change and be sensed by various electrical sensors when contaminated with organic material from the hot combustion gases 192. Such buckling of the tip face critical location 272 may be preferred compared to buckling of the oxygen side critical location 270, which may cause oxygen 158 to enter the coolant 180. Compared to detecting the hot combustion gases 192 in the coolant 180, detecting oxygen 158 may be very difficult. Thus, the potential buckling of the illustrated embodiments at the tip face critical location 272 may be preferred.

As described above, embodiments of the fuel injector 104 with the tip portion 172 may have improved lives and buckling characteristics compared to other fuel injectors without the tip portion 172. In addition, the tip portion 172 may be easy to fabricate and remove for repairs. Furthermore, the improved heat transfer characteristics of the tip portion 172 may help to reduce corrosion caused by localized hot areas. In certain embodiments, the tip portion 172 includes the coolant chamber 178 disposed between the inner wall 174 and the outer wall 176. Coolant 180 circulating through the coolant chamber 178 helps to remove heat from the tip portion 172. In some embodiments, the coolant inlet 200 and the coolant outlet 202 enter the coolant chamber 178 radially through the outer wall 176. In other embodiments, the first and second curved portions 226 and 228 of the tip portion 172 may help to block the hot combustion gases 192 from reaching the rim 186, thereby protecting the rim 186 and extending its life. In further embodiments, the tip portion 172 may only include the first curved portion 226, which may also help to block the hot combustion gases 192 from the rim 186. In yet further embodiments, the outer wall diameter 254 of the tip portion 172 may increase progressively and decrease progressively from the rim 186 to the neck 184, thereby providing a shape to the tip portion 172 that helps to block the hot combustion gases 192 from the rim 186.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
  a gasification fuel injector, comprising:
    a tip portion surrounding an injection passage configured to inject a fluid in a downstream direction, wherein the tip portion comprises an inner wall surrounding the injection passage and extending in the downstream direction from a neck to a rim, an outer wall surrounding the inner wall and extending from the neck to the rim, and a coolant chamber between the inner and outer walls, wherein the coolant chamber has a radial dimension relative to a longitudinal axis of the tip portion, wherein the outer wall comprises a curved wall portion that curves along at least half of the radial dimension of the coolant chamber, wherein the curved wall portion curves radially away from the rim in the downstream direction to a first position followed by an upstream direction to a second position, wherein the first position is downstream of the rim and the second position is upstream of the rim, wherein the curved wall portion curves radially away from the rim with a first radius of curvature followed by a second radius of curvature, wherein the first radius of curvature is different from the second radius of curvature.

2. The system of claim 1, wherein the curved wall portion of the outer wall curves directly radially away from the rim in the downstream direction toward the first position.

3. The system of claim 1, wherein the outer wall has an outer wall diameter relative to the longitudinal axis of the tip portion of the gasification fuel injector, and the outer wall diameter progressively increases and then progressively decreases from the rim to the neck.

4. The system of claim 1, wherein the first radius of curvature is greater than the second radius of curvature.

5. The system of claim 1, wherein the first radius of curvature curves radially away from the rim at least in the downstream direction toward the first position, and the second radius of curvature curves radially away from the rim at least in the upstream direction toward the second position.

6. The system of claim 1, wherein the inner wall has a first constant thickness, the outer wall has a second constant thickness, and the first and second constant thicknesses are equal to one another.

7. The system of claim 1, wherein the inner wall is an inner annular wall, the outer wall is an outer annular wall coaxial with the inner annular wall, the coolant chamber is an annular coolant chamber disposed between the inner and outer annular walls, the rim is an annular rim, and the neck is an annular neck.

8. The system of claim 1, wherein the tip portion comprises a coolant inlet and a coolant outlet extending in a radial direction through the outer wall into the coolant chamber, wherein the radial direction is perpendicular to the longitudinal axis of the tip portion of the gasification fuel injector.

9. The system of claim 1, wherein the curved wall portion curves radially away from the rim in the downstream direction to block recirculation of a hot gas toward the rim.

10. The system of claim 1, wherein the tip portion is configured to buckle preferentially along the outer wall.

11. The system of claim 1, comprising a gasifier having the gasification fuel injector.

12. A system, comprising:
a fuel injector, comprising:
a fuel passage configured to inject a fuel in a downstream direction;
an oxidant passage configured to inject oxidant in the downstream direction; and
a tip portion surrounding the fuel passage and the oxidant passage, wherein the tip portion comprises an inner wall surrounding the fuel passage and the oxidant passage and extending in the downstream direction from a neck to a rim, an outer wall surrounding the inner wall and extending from the neck to the rim, and a coolant chamber between the inner and outer walls, wherein the coolant chamber has a radial dimension relative to a longitudinal axis of the tip portion, wherein the outer wall comprises a curved wall portion that curves along at least half of the radial dimension of the coolant chamber, wherein the curved wall portion curves radially away from the rim in the downstream direction to a first position followed by an upstream direction to a second position, wherein the first position is downstream of the rim and the second position is upstream of the rim, wherein the tip portion comprises a coolant inlet and a coolant outlet extending in the radial direction through the outer wall into the coolant chamber, wherein the radial direction is perpendicular to the longitudinal axis of the tip portion of the fuel injector.

13. The system of claim 12, wherein the curved wall portion of the outer wall curves directly radially away from the rim in the downstream direction toward the first position.

14. The system of claim 12, wherein the curved wall portion of the outer wall curves radially away from the rim with a first radius of curvature followed by a second radius of curvature, wherein the first radius of curvature is greater than the second radius of curvature.

15. The system of claim 12, wherein the curved wall portion curves radially away from the rim in the downstream direction to block recirculation of a hot gas toward the rim.

16. The system of claim 12, wherein the tip portion is configured to buckle preferentially along the outer wall.

17. A system, comprising:
a combustion chamber; and
a fuel injector coupled to the combustion chamber, wherein the fuel injector comprises:
a fuel passage configured to inject a fuel in a downstream direction; and
a tip portion surrounding the fuel passage, wherein the tip portion comprises an inner wall surrounding the fuel passage and extending in the downstream direction from a neck to a rim, an outer wall surrounding the inner wall and extending from the neck to the rim, and a coolant chamber between the inner and outer walls, wherein the outer wall comprises a curved wall portion that curves radially away from the rim in the downstream direction to a first position followed by an upstream direction to a second position, wherein the first position is downstream of the rim and the second position is upstream of the rim, wherein the outer wall has an outer wall diameter relative to a longitudinal axis of the fuel injector, and the outer wall diameter progressively increases and then progressively decreases from the rim to the neck around the coolant chamber.

18. The system of claim 17, wherein the curved wall portion of the outer wall curves directly radially away from the rim in the downstream direction toward the first position.

19. The system of claim 17, wherein the curved wall portion curves radially away from the rim with a first radius of curvature followed by a second radius of curvature.

20. The system of claim 17, wherein the inner wall is an inner annular wall, the outer wall is an outer annular wall coaxial with the inner annular wall, the coolant chamber is an annular coolant chamber disposed between the inner and outer annular walls, the rim is an annular rim, and the neck is an annular neck.

21. The system of claim 12, wherein the inner wall of the tip portion having the coolant chamber is disposed directly along the oxidant passage.

22. A system, comprising:
a gasification fuel injector, comprising:
a tip portion surrounding an injection passage configured to inject a fluid in a downstream direction, wherein the tip portion comprises an inner wall surrounding the injection passage and extending in the downstream direction from a neck to a rim, an outer wall surrounding the inner wall and extending from the neck to the rim, and a coolant chamber between the inner and outer walls, wherein the outer wall comprises a curved wall portion that curves radially away from the rim in the downstream direction to a first position followed by an upstream direction to a second position, wherein the first position is downstream of the rim and the second position is upstream of the rim, wherein the curved wall portion curves radially away from the rim with a first radius of curvature followed by a second radius of curvature, wherein the first radius of curvature is greater than the second radius of curvature.

23. A system, comprising:
a gasification fuel injector, comprising:
  a tip portion surrounding an injection passage configured to inject a fluid in a downstream direction, wherein the tip portion comprises an inner wall surrounding the injection passage and extending in the downstream direction from a neck to a rim, an outer wall surrounding the inner wall and extending from the neck to the rim, and a coolant chamber between the inner and outer walls, wherein the inner wall is an inner annular wall, the outer wall is an outer annular wall coaxial with the inner annular wall, the coolant chamber is an annular coolant chamber disposed between the inner and outer annular walls, the rim is an annular rim, and the neck is an annular neck, wherein the outer wall comprises a curved wall portion that curves radially away from the rim in the downstream direction to a first position followed by an upstream direction to a second position, wherein the first position is downstream of the rim and the second position is upstream of the rim, wherein the curved wall portion curves radially away from the rim with a first radius of curvature followed by a second radius of curvature, wherein the first radius of curvature is greater than the second radius of curvature.

* * * * *